United States Patent
Xie et al.

(10) Patent No.: US 11,416,708 B2
(45) Date of Patent: Aug. 16, 2022

(54) SEARCH ITEM GENERATION METHOD AND RELATED DEVICE

(71) Applicant: Tencent Technology (Shenzhen) Company Limited, Shenzhen (CN)

(72) Inventors: Runquan Xie, Shenzhen (CN); Fengzong Lian, Shenzhen (CN); Zeqian Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 528 days.

(21) Appl. No.: 16/544,642

(22) Filed: Aug. 19, 2019

(65) Prior Publication Data
US 2019/0370605 A1 Dec. 5, 2019

Related U.S. Application Data

(63) Continuation of application No. PCT/CN2018/097748, filed on Jul. 30, 2018.

(30) Foreign Application Priority Data

Jul. 31, 2017 (CN) .......................... 201710642152.5

(51) Int. Cl.
G06F 16/00 (2019.01)
G06N 20/00 (2019.01)
(Continued)

(52) U.S. Cl.
CPC ....... *G06K 9/6257* (2013.01); *G06F 16/9038* (2019.01); *G06F 16/90335* (2019.01);
(Continued)

(58) Field of Classification Search
CPC ........ G06N 20/00; G06N 20/10; G06N 7/005; G06Q 40/025; G06Q 40/284;
(Continued)

(56) References Cited

U.S. PATENT DOCUMENTS

| 7,788,276 B2 | 8/2010 | Peng et al. |
| 9,449,283 B1 * | 9/2016 | Purpura ................. G06N 20/00 |

(Continued)

FOREIGN PATENT DOCUMENTS

| CN | 101650731 A | 2/2010 |
| CN | 103838793 A | 6/2014 |

(Continued)

OTHER PUBLICATIONS

Florian Tramer et al., "Stealing Machine Learning Models via Prediction APIs", Proceedings of the 25th USENIX Security Symposium, Aug. 10-12, 2016, pp. 601-618.*

(Continued)

*Primary Examiner* — Srirama Channavajjala
(74) *Attorney, Agent, or Firm* — Morgan, Lewis & Bockius LLP

(57) ABSTRACT

This application provides a retrieval item generation method. In the method, a machine learning model is used to determine discarding/keeping conditions of terms in a query, and the machine learning model is obtained by training by a query sample having a target term feature. Compared with an existing retrieval item generation method, the target term feature can reflect importance of a term for a query result, and the machine learning model obtained by training by using the target term feature has a more accurate selection result of terms in the query, to generate a more accurate retrieval item, thereby avoiding recall of an unrelated query result. In addition, this application further provides a related apparatus for generating a retrieval item, to ensure actual implementation and application of the foregoing method.

13 Claims, 6 Drawing Sheets

(51) Int. Cl.
*G06K 9/62* (2022.01)
*G06F 16/903* (2019.01)
*G06F 16/9038* (2019.01)

(52) U.S. Cl.
CPC ......... *G06K 9/6231* (2013.01); *G06K 9/6232* (2013.01); *G06N 20/00* (2019.01)

(58) Field of Classification Search
CPC .............. G06Q 30/016; G06Q 30/0251; G06F 16/313; G06F 16/345; G06F 16/35; G06F 16/532; G06F 16/951; G06F 16/583; G06F 16/9535; G06F 16/90335; G06F 16/9038; G06K 9/6228; G06K 9/6256; G06K 9/6257; G06K 9/6231; G06K 9/6232
See application file for complete search history.

(56) References Cited

U.S. PATENT DOCUMENTS

| | | | |
|---|---|---|---|
| 10,970,629 B1* | 4/2021 | Dirac | G06N 7/005 |
| 11,144,581 B2* | 10/2021 | Masuda | G06F 16/353 |
| 2015/0170053 A1* | 6/2015 | Miao | G06N 20/00 706/12 |
| 2018/0018590 A1* | 1/2018 | Szeto | G06N 20/10 |
| 2018/0032870 A1* | 2/2018 | Liu | G06Q 40/025 |
| 2018/0032890 A1* | 2/2018 | Podgorny | G06Q 30/016 |
| 2018/0260699 A1* | 9/2018 | Natroshvili | G06N 20/10 |
| 2018/0329951 A1* | 11/2018 | Yu | G06N 20/00 |
| 2019/0034882 A1* | 1/2019 | Saha | G06N 20/00 |

FOREIGN PATENT DOCUMENTS

| | | |
|---|---|---|
| CN | 104376065 A | 2/2015 |
| CN | 106934063 A | 7/2017 |
| WO | WO2017034820 A1 * | 3/2017 |
| WO | WO2017180208 A1 * | 10/2017 |
| WO | WO 2018199913 A1 * | 11/2018 |

OTHER PUBLICATIONS

Tencent Technology, ISR, PCT/CN2018/097748, Oct. 29, 2018, 2 pgs.

Tencent Technology, WO, PCT/CN2018/097748, Oct. 29, 2018, 4 pgs.

Tencent Technology, IPRP, PCT/CN2018/097748, Feb. 4, 2020, 5 pgs.

* cited by examiner

SEARCH ITEM GENERATION METHOD AND RELATED DEVICE

CROSS-REFERENCE TO RELATED APPLICATIONS

This application is a continuation application of PCT/CN2018/097748, entitled "RETRIEVAL ITEM GENERATION METHOD AND RELATED APPARATUS" filed on Jul. 30, 2018, which claims priority to Chinese Patent Application No. 201710642152.5, entitled "RETRIEVAL ITEM GENERATION METHOD AND RELATED APPARATUS" filed with the Chinese Patent Office on Jul. 31, 2017, both of which are incorporated by reference in their entirety.

FIELD OF THE TECHNOLOGY

This application relates to the field of retrieval technologies, and more specially, to a retrieval item generation method, a related apparatus, an electronic device, and a computer-readable storage medium.

BACKGROUND OF THE DISCLOSURE

Search refers to operations of collecting information matching a query from a network according to a certain query strategy after obtaining the query, organizing and processing the information for presentation, and the like.

Specifically, a term segmentation operation is performed on the query during search, to obtain several independent terms, information lists related to the terms are retrieved, and then an intersection of the information lists corresponding to the terms is obtained, to obtain a recalled document. Usually, a quantity of recalled documents obtained by obtaining an interaction of the information lists of all the terms is excessively small, and good documents cannot be recalled. Therefore, the terms obtained by the query need to be screened, and terms for retrieval are selected. A set of these terms may be referred to as a retrieval item, and then the recalled documents are obtained by using only information lists of the selected terms.

SUMMARY

Currently, when a retrieval item is generated, a selected term does not have high accuracy, and consequently, a problem of poor correlation between a recalled document and a query may be easily caused.

In view of the above, this application provides a retrieval item generation method, and a query result obtained by the retrieval item generated by using the method has higher accuracy.

According to a first aspect, this application provides a retrieval item generation method performed at a computing device having one or more processors and memory storing programs to be executed by the one or more processors, the method comprising:

generating a machine learning model by training by a query sample, the query sample comprising a term, the term having a target term feature, and the target term feature being used for indicating importance of the term for a query result;

obtaining a target query, and determining an eigenvalue of a term in the target query on the target term feature; and inputting the target query and the eigenvalue into the machine learning model, to obtain a retrieval item corresponding to the target query.

In an exemplary embodiment, the machine learning model is generated by:

determining a discarding/keeping condition of the term in the query sample after obtaining the query sample, the discarding/keeping condition being used for indicating whether the term is used for generating the retrieval item;

determining an eigenvalue of the term on the target term feature; and training the query sample, the discarding/keeping condition of the term, and the eigenvalue of the term, to obtain the machine learning model.

According to a second aspect, this application provides a computing device comprising one or more processors, memory coupled to the one or more processors and a plurality of programs stored in the memory that, when executed by the one or more processors, cause the computing device to perform the aforementioned retrieval item generation method.

According to a third aspect, this application provides a non-transitory computer readable storage medium storing a plurality of machine readable instructions in connection with a computing device having one or more processors, wherein the plurality of machine readable instructions, when executed by the one or more processors, cause the terminal to perform the aforementioned retrieval item generation method.

It can be known from the foregoing technical solutions that this application provides a retrieval item generation method. In the method, a machine learning model is used to determine discarding/keeping conditions of terms in a query, and the machine learning model is obtained by training by using a query sample having a target term feature. Compared with an existing retrieval item generation method, the target term feature can reflect a feature of importance of a term for a query result, and the machine learning model obtained by training by using the target term feature can more accurately determine the discarding/keeping condition of the term in the query, to generate a more accurate retrieval item, thereby avoiding recall of an unrelated query result.

BRIEF DESCRIPTION OF THE DRAWINGS

To describe the technical solutions in the embodiments of the present application or in the existing technology more clearly, the following briefly describes the accompanying drawings required for describing the embodiments or the existing technology. Apparently, the accompanying drawings in the following description show merely some embodiments of this application, and a person of ordinary skill in the art may still derive other drawings from these accompanying drawings without creative efforts.

FIG. 1 and FIG. 2 are schematic diagrams of query results obtained by using different retrieval items.

DESCRIPTION OF EMBODIMENTS

Figure 3:
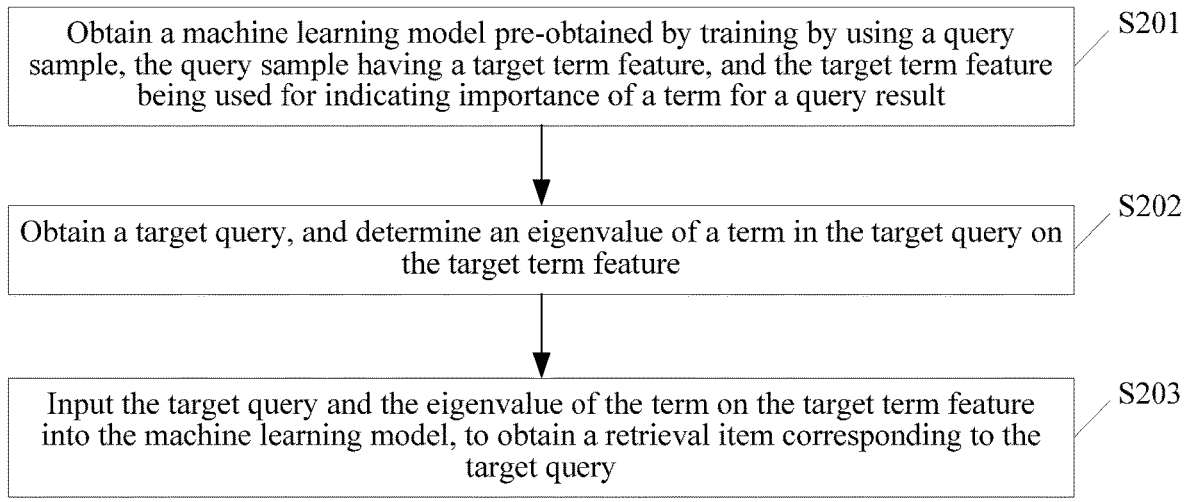
FIG. 3 is a flowchart of a retrieval item generation method according to this application.

The following clearly and completely describes the technical solutions in the embodiments of the present application with reference to the accompanying drawings in the embodiments of the present application. Apparently, the described embodiments are some embodiments of the present application rather than all of the embodiments. All other embodiments obtained by a person of ordinary skill in the art based on the embodiments of this application without creative efforts shall fall within the protection scope of this application.

Search refers to operations of collecting information matching a query from a network according to a certain query strategy after obtaining the query, organizing and processing the information for presentation, and the like. A query may also be referred to as a search sentence, and a process of collecting and retrieving information matching the query may also be referred to as recalling a document.

Figures 1, 2:
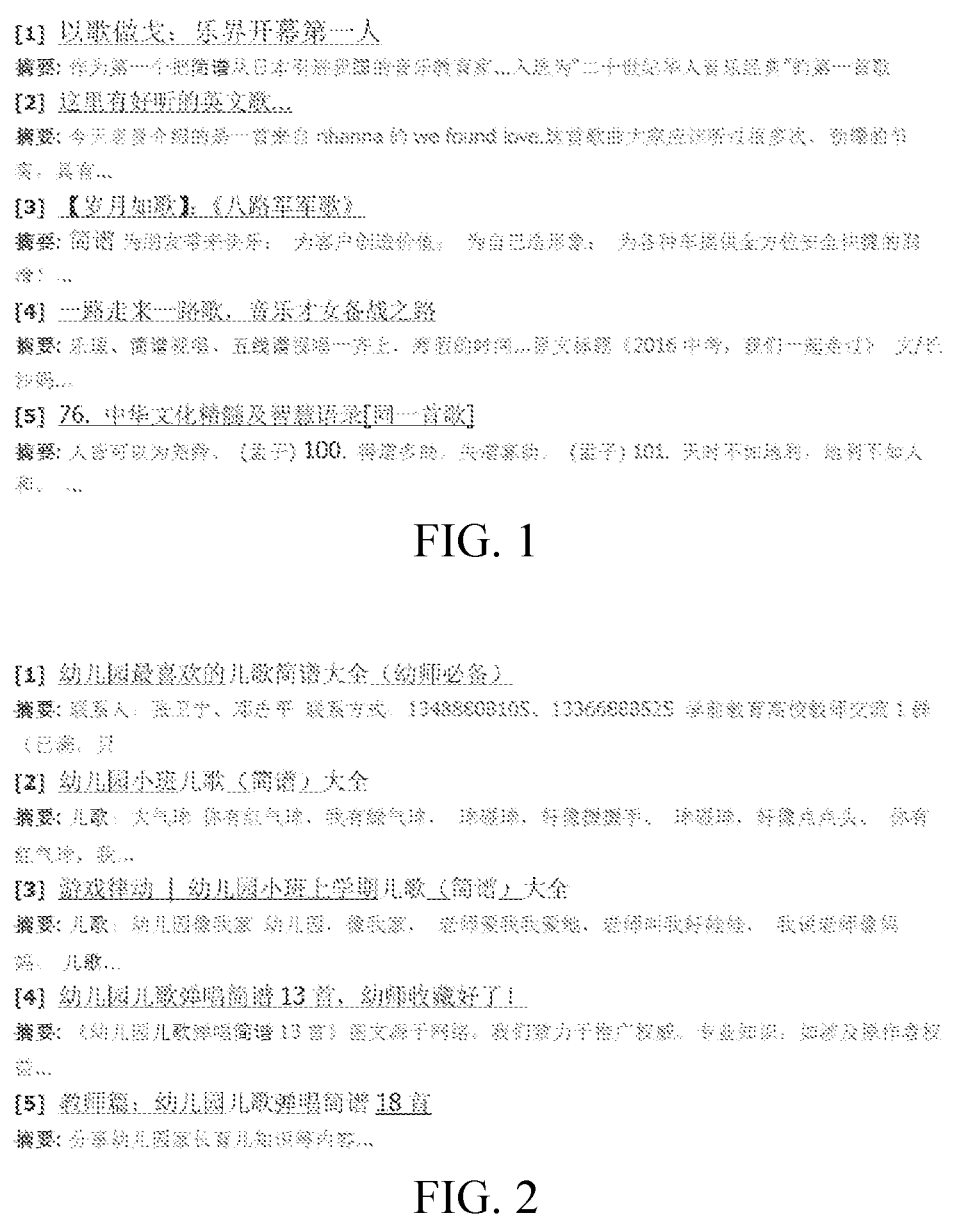

A term segmentation operation is performed on the query during search. If all terms are used to recall a document, a small quantity of documents are obtained, and good documents cannot be recalled. For example, a query is "儿歌简谱大全100首" (English translation "A collection of 100 children's songs' notations"), and a term segmentation result includes "儿歌" "简谱" "大全" and "100首". If all terms are used for retrieval, a recalled document is shown in FIG. 1, and a retrieval result is not highly related to the query. In a user retrieval scenario, user retrieval experience is poor.

Therefore, to ensure accuracy of the recalled document, terms obtained by the query need to be screened, and terms for retrieval and terms that can be discarded are selected. A term for retrieval may be referred to as a certainly kept term, and a term to be discarded may be referred to as a non-certainly kept term. A selection process may be referred to as searching a non-certainly kept term or searching a certainly kept term. A set of selected terms for retrieval may be referred to as a query item or a retrieval item. In actual application, retrieval by using retrieval items after some terms are discarded has better effect than retrieval by using a complete query.

It may be understood that determining a certainly kept term and a non-certainly kept term is an important step in retrieval, and whether a result is accurate determines whether a recalled document is good. In a current retrieval item generation method, not high accuracy for determining which terms are certainly kept terms and which terms are non-certainly kept term is provided, a generated retrieval item is not sufficiently accurate, and consequently, a recalled document is not sufficiently accurate.

This is because that in the current retrieval item generation method, a weight of each term is obtained through term empowerment, terms are sorted according to weights, and then which terms can be kept and which terms can be discarded are determined with reference to a template and posterior rules. For example, a query is "民国时期人物" (English translation "figures in the Republic of China period"), and terms obtained after a term segmentation operation is performed on the query include "民国" (English translation "the Republic of China") "时期" (English translation "period") and "人物" (English translation "figures"). A term empowerment method is that a weight set for a term "民国" (English translation "the Republic of China") is 0.8357, a weight set for a term "时期" (English translation "period") is 0.8045, and a weight set for a term "人物" (English translation "figures") is 0.3494. According to an order of weights, the term "民国" (English translation "the Republic of China") and the term "时期" (English translation "period") are determined as certainly kept terms, and the term "人物" (English translation "figures") is determined as the non-certainly kept term.

When term weights are set through term empowerment, in the method, only an independent feature such as a quantity of times of occurrence of each time, of the term is used to determine the term, and an association feature between terms is not considered. Therefore, consequently, a discarding/keeping result of the term is not accurate.

In actual application, a manifestation of the discarding/keeping result of the term being not accurate is: some of meaningful segment terms are discarded. This situation leads to semantic drift and recalling an unrelated document. For example, a query is "怎样查 看陌生人的朋友圈" (English translation "how to access a stranger's friends circle"), and a term segmentation result thereof include "怎样" "查看" "陌生" "人" "的" "朋友" and "圈". "朋友" and "圈" are two terms have high closeness, and in a current selection method, a situation in which "朋友" is discarded, and "圈" is kept or a situation in which "圈" is discarded, and "朋友" is kept may occur, leading to semantic drift and finding an unrelated document.

Another manifestation of the discarding/keeping result of the term being not accurate is: some terms that are crucial to the query are discarded, while some terms that are not crucial to the query are kept. Using the query "民国时期人物" as an example, it can be known from weights that the term "时期" has a higher probability of being kept than the term "人物". However, it can be known according to manual experience that the term "人物" are more supposed to be kept.

As regards this, this application provides a retrieval item generation method. In the method, a discarding/keeping condition of a term is determined according to importance of the term for a query result, improving accuracy of a generated retrieval item to a large extent, and further improving accuracy of a retrieval result. Using the query "儿歌简谱大全100首" (English translation "A collection of 100 children's songs' notations") in FIG. 1 as an example again, in this application, retrieval items generated for the query include 儿 歌" and "简谱", and a document found by using the retrieval item is shown in FIG. 2. It can be known by comparing FIG. 1 and FIG. 2 that a document recalled by the retrieval item obtained in this application is obviously more accurate than a recalled document in FIG. 1.

As shown in FIG. 3, the retrieval item generation method provided in this application specifically includes the following steps S201 to S203.

S201: Obtain a machine learning model pre-obtained by training by using a query sample, the query sample having a target term feature, and the target term feature being used for indicating importance of a term for a query result.

Machine learning is an artificial intelligence science, and uses existing experience data to automatically learn a model to perform result prediction on unknown data. In a specific application scenario of generating a retrieval item in the field of search, existing experience data is a query, the machine learning model is obtained by training a training set including a plurality of query samples by using a machine learning algorithm. For example, a training manner of the machine learning model may be but not limited to a gradient boosting decision tree (GBDT).

The query sample used by the machine learning model during training has a target term feature. It should be noted that the target term feature may indicate importance of the term for the query result (that is, the recalled document). There may be one or more target term features. For example, the target term feature may include one or more of the following items: a part-of-speech feature, a syntax dependency feature, an inverse document frequency feature, a pointwise mutual information feature, a term vector class feature, an importance (IMP) feature, a closeness feature, and a term dimension feature. Meanings and calculation manners of the several target term features are described below, and are not described in detail herein. It should be noted that the target term feature is not limited to the foregoing several items and may also be items in actual application.

Specifically, the importance of the target term feature for the query result may be embodied in that the target term feature not only includes an independent feature of the term but also includes an association feature between the term and other terms. The association feature may also be referred to as a relative feature between terms. Using the foregoing several target term features as an example, the association feature may specifically include a syntax dependency feature, a pointwise mutual information feature, a term vector class feature, a closeness feature, and the like.

The association feature between the term and other terms may prevent some of meaningful term segments from being discarded, to avoid finding an unrelated result caused by semantic drift, for example, prevent the term "朋友" or the term "圈" in "朋友圈" from being discarded, to avoid finding a document related to "朋友" or a document related to "圈".

In addition, the query sample has a corresponding query result. A value of the target term feature may be calculated according to a hit situation of the query result. Therefore, the importance of the term for the query result may also be embodied in that the target term feature may reflect whether the query result is accurate. Such a target term feature capable of reflecting a hit situation of the query result embodies accuracy of the query result. Therefore, accuracy of a prediction result of the machine learning model can be improved in some degree.

For example, a user inputs a query in a search engine, the search engine presents found related documents to the user, and the user clicks a presented document, indicating that the document is hit. Therefore, the query may be used, and a target term feature of each term in the query is calculated depending on whether the recalled document of the query and documents are hit. The target term feature is used for training the machine learning model. Using the foregoing several target term features as an example, a calculated IMP feature can achieve the effect.

S202: Obtain a target query, and determine an eigenvalue of a term in the target query on the target term feature.

The target query is a query whose retrieval items are to be generated, that is, a query whose term discarding/keeping condition is to be determined. In a user search application scenario, the target query may be a query input by the user, such as "插口灯泡怎么换" (English translation "How to change a plug-in lamp"). After the target query is obtained, a term segmentation operation may be first performed on the target query. For example, a term segmentation result is "插口" "灯泡" "怎么" "换", and then an eigenvalue of each term on target term feature is calculated.

It should be noted that the target term feature is a target term feature used by training the machine learning model. If there is a plurality of target term features, an eigenvalue of each term on each target term feature is determined. That is, in this case, each term has a plurality of target term eigenvalues.

It is assumed that the target term feature includes closeness, a target query is "一代宗师宋慧乔结局" (English translation "Outcome of a one-generation master Song Hui Qiao"), a term segmentation result of the target query is "一代" "宗师" "宋" "慧" "乔" "结局", and closeness values of the terms are calculated and are: 一代 0.678 宗师 0.057 宋 0.568 慧 0.670 乔 0.061 结局. Therefore, it can be known that closeness between the term "一代" and the term "宗师" is 0.678, and closeness between the term "宗师" and the term "宋" is "0.057", closeness between the term "宋" and the term "慧" is "0.568", and so on. It can be learned that the closeness 0.678 between the term "一代" and the term "宗师" is far greater than the closeness 0.057 between the term "宗师" and the term "宋".

The target term feature may not only include parameters. Therefore, an eigenvalue of the target term feature may not necessarily only include values. For example, when the target term feature includes the part-of-speech feature, an eigenvalue of the part-of-speech feature is a part-of-speech mark. Using a term set "插口" "灯泡" "怎么" "怎么" as an example, eigenvalues of part-of-speech features of the terms are respectively a noun, a noun, a pronoun and a verb.

S203: Input the target query and the target term eigenvalue of the term in the target query into the machine learning model, to obtain a retrieval item corresponding to the target query.

The eigenvalue of the term on the target term feature may be referred to as the target term eigenvalue for short. After the target term eigenvalue of the term in the target query is obtained, the target query and the target term eigenvalue may be input to the machine learning model.

The machine learning model has a calculation manner thereof and may calculate a keeping probability of each term, so that a discarding/keeping condition of the term may be determined according to the keeping probability. For example, a term discarding/keeping condition of a target query "上班甲醛超标怎么办" (English translation "how to cope with a work environment where the formaldehyde level exceeds a threshold") is: 上班 (non-certainly kept) 甲醛 (kept) 超标 (kept) 怎么 (non-certainly kept) 办 (non-kept).

In an example, terms may be sorted according to a descending order of keeping probabilities, a preset quantity of terms whose keeping probabilities are ranked front are selected therefrom as kept terms, and the remaining terms are used as terms that can be discarded. In another example, terms whose keeping probabilities exceed a preset threshold may be selected therefrom as kept terms, and the remaining terms are used as terms that can be discarded. Certainly, there may be other discarding/keeping selection manners, and this is not limited to the foregoing two manners.

A set of terms that are determined to be kept may be referred to as retrieval items, and query is performed by using the retrieval items, to obtain a query result corresponding to the query. Alternatively, when the discarding/keeping condition of the term is determined by using the machine learning model, the machine learning model may output only the keeping probability of the term, and then another module generates the retrieval items according to the keeping probability.

It can be known from the foregoing technical solutions that this application provides a retrieval item generation method. In the method, a machine learning model is used to determine discarding/keeping conditions of terms in a query, and the machine learning model is obtained by training by using a query sample having a target term feature. Compared with an existing retrieval item generation method, the target term feature can reflect a feature of importance of a term for a query result, and the machine learning model obtained by training by using the target term feature has a more accurate selection result of the terms in the query, thereby avoiding recall of an unrelated query result.

Another problem of the existing retrieval item generation method is: discarding/keeping of the term in the query needs to be determined and selected according to a click behavior log of the user, queries with different search volumes have different data volumes in the click behavior log, and discarding/keeping determining of terms in a query with a small search volume has low accuracy.

Figure 4:
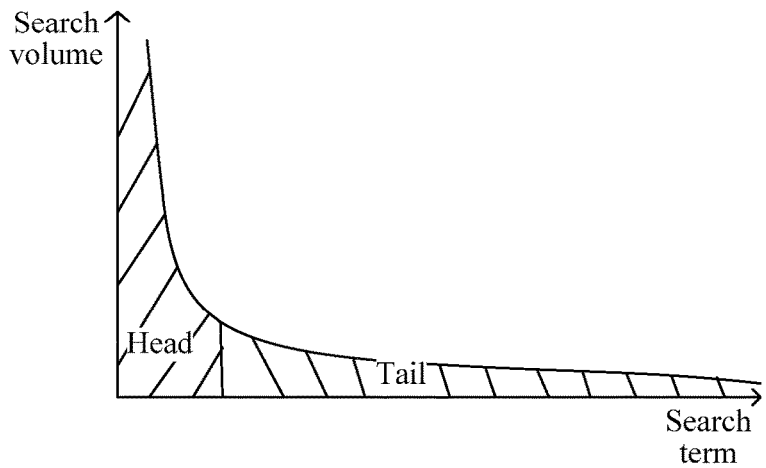
FIG. 4 is a schematic diagram of a search volume curve of a query according to this application.

Specifically, search volume curves of the queries may be obtained according to the click behavior log. As shown in FIG. 4, a search volume curve includes a head and a tail, the head corresponds to a query with a large search volume, and the tail corresponds to a query with a small search volume. For example, "微信" is a query located at the head, and "微信通讯录" is a query located at the tail. A query located at the head has a large search volume, and related data in the click behavior log is much. On the contrary, a query located at the tail has a small search volume, and related data in the click behavior log is little. When a term located at the tail is selected by using the click behavior log, related data is little, and consequently, selection accuracy is not high.

However, in the retrieval item generation method provided in this application, determining is not performed relying on the click behavior log, achieving good determining results for both head queries and tail queries.

A training process of a machine learning model is specifically described below.

Figure 5:
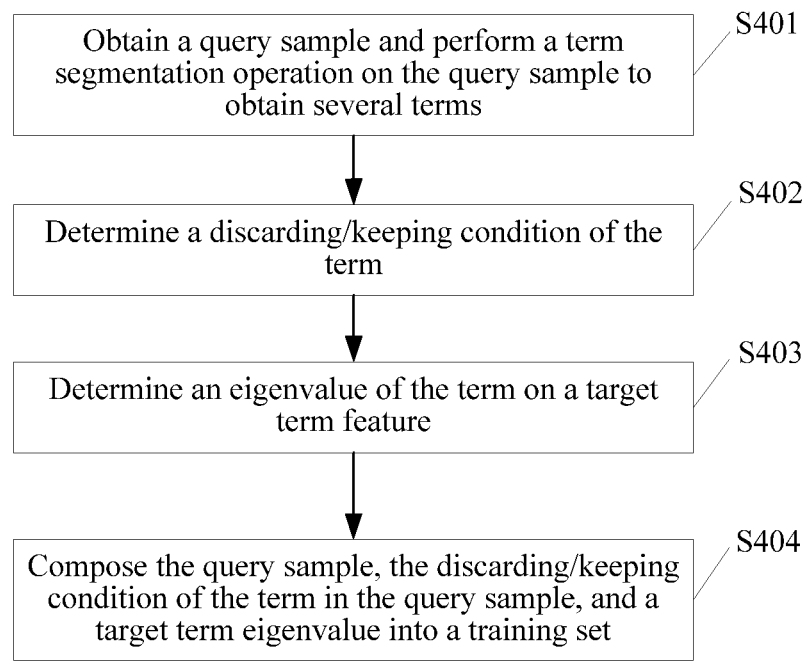
FIG. 5 is a flowchart of a training set generation manner according to this application.

As shown in FIG. 5, a training process of the machine learning model includes the following steps S401 to S404.

S401: Obtain a query sample and perform a term segmentation operation on the query sample to obtain several terms.

Before implementation, some basic data, such as a query log of the user and a document recalled by queries in the query log, may be pre-collected. The query sample may be obtained from the query log of the basic data. For example, query logs of a large quantity of users are collected, and queries in the query logs of these users are used as the query samples. A term segmentation operation is performed on each query sample, to obtain a term segmentation result of each query sample.

S402: Determine a discarding/keeping condition of the term.

For each term of each query sample, a discarding/keeping condition of the term needs to be determined. The discarding/keeping condition is used for indicating whether the term is used for generating the retrieval item. A determining manner is manually annotated. However, this manner costs labor costs and is strongly subjective, and consequently, an inaccurate standard may easily occur. Therefore, the following determining manner based on statistics may be used.

The recalled document corresponding to the query sample is obtained. For example, the user inputs a query in the search engine. The search engine presents a quantity of documents. If the query is used as a sample for machine learning training, all documents presented by the search engine, or some documents ranked front, or documents clicked by the user are used as recalled documents.

After the recalled document corresponding to the query sample is obtained, a feature, such as a quantity of times of occurrence, of the term of the query sample in the recalled document is counted, and the discarding/keeping condition of the term in the query sample is determined.

In an example, a score of the term is calculated according to the counted feature, and the discarding/keeping condition of the term is determined according to the score.

A specific manner of calculating the score of the term is: counting a quantity of times of occurrence of the term at locations such as a title, an abstract, marked red information, and a main text of the recalled document, and calculating the score of the term according to a location of occurrence of the term, a weight corresponding to the location, and a quantity of times of occurrence at the location. Different locations have different weights. In this way, because the term occurs at different locations, importance of the term for the query result is different. For example, that the term occurs at a title, an abstract, and marked red information of a recalled document further indicates accuracy of the recalled document. Therefore, weights of these locations are higher.

An implementation of determining the discarding/keeping condition of the term according to the score is: performing sorting according to scores, determining a preset quantity of terms ranked front as certainly kept terms, and determining the remaining terms as non-certainly kept terms. Another implementation is: determining terms whose scores reach a preset score threshold as certainly kept terms and determining the remaining terms as non-certainly kept terms.

The training set constructed based on a counting manner stated above may contain noise. Therefore, a manual annotation manner may be used to correct a result of the foregoing automatic annotation. For example, a certainly kept term is corrected to be a non-certainly kept term, or a non-certainly kept term is corrected to be a certainly kept term. During manual correction, there may be a plurality of correction results due to different manual subjective standards. A correction result with many non-certainly kept terms may be referred to as an aggressive result, and a correction result with few non-certainly kept terms may be referred to as a conservative result.

For example, a query sample is "上班甲醛超标怎么办", a conservative result and an aggressive result are shown in Table 1, 1 indicates certainly kept, and 0 indicates non-certainly kept.

TABLE 1

|  | Conservative result | Aggressive result |
|---|---|---|
| 上班 (work environment) | 1 | 0 |
| 甲醛 (formaldehyde) | 1 | 1 |
| 超标 (exceed a threshold) | 1 | 1 |
| 怎么 (how) | 0 | 0 |
| 办 (cope with) | 0 | 0 |

S403: Determine an eigenvalue of the term on a target term feature.

It should be noted that the target term feature is the target term feature in step S201. The target term feature may represent importance of the term for the query result. It should be noted that step S402 and step S403 are not limited in execution sequences. Step S402 may be first performed, or step S403 may be first performed, or step S402 and step S403 may be performed at the same time.

The eigenvalue of the term on the target term feature may be referred to as the target term eigenvalue, and the target term eigenvalue may be calculated according to a pre-generated target term feature dictionary or a target term feature tree. Specific calculation manners of several target term eigenvalues are described below.

1. For the part-of-speech feature, a part-of-speech of the term is determined.

For example, a term segmentation result of a query "插口灯泡怎么换" is "插口" "灯泡" "怎么" "换", and parts-of-speech are respectively a noun, a noun, a pronoun, and a verb.

It should be noted that importance of parts-of-speech such as a noun, an entity term, a person name, and a location name is greater than that of an adjective, a verb, and the like, and importance of parts-of-speech such as an adjective and a verb is greater than that of meaningless terms such as a conjunction, a preposition, an auxiliary word, and a sentence word. When the machine learning model is trained, and the machine learning model is used to determine discarding/keeping of the term, a weight of a part-of-speech with high importance is greater than that of a part-of-speech with low importance, and the part-of-speech with high importance has a higher probability of being kept.

2. For the syntax dependency feature, a syntax dependency tree pre-generated according to a corpus is obtained, and a syntax dependency feature of the term is extracted from the syntax dependency tree.

Specifically, corpora such as news and essays may be pre-collected, and a syntax dependency tree of sentences is extracted from the corpora. The corpus may contain a document recalled by the query sample or contain other documents, or contain both.

Figure 6:
FIG. 6 is a schematic diagram of a syntax dependency tree of a query according to this application.

For example, a syntax dependency tree of the query "插口灯泡怎么换" is shown in FIG. 6, head (HED) refers to a core relationship, attribute (ATT) refers to an attribute centered relationship, subject-verb (SBV) refers to a subjective-predicate relationship, and adverbial (ADV) refers to an adverbial centered relationship.

The syntax dependency feature of the term may be extracted from the syntax dependency tree. For example, a term "灯泡" has two syntax dependency features, respectively an externally pointing ATT relationship and an internally pointing SBV relationship and respectively marked as 灯泡_to_ATT=1 and 灯泡_from_SBV=1.

It should be noted that terms that some relationships such as a subject-verb-object relationship and a core relationship point to and that point to the relationships have higher importance. Therefore, when the machine learning model is trained, and the machine learning model is used to determine discarding/keeping of the term, a weight of a syntax dependency feature with high importance is greater than that of a syntax dependency feature with low importance, so that the syntax dependency feature with high importance has a higher probability of being kept.

3. For the inverse document frequency (IDF), it is a reciprocal of a document frequency (DF) and is related to a quantity of recalled documents. A larger inverse document frequency indicates fewer recalled documents, and a smaller inverse document frequency indicates more recalled documents.

When the inverse document frequency of the term is calculated, an inverse document frequency dictionary (IDF dictionary) pre-generated according to a corpus is obtained. The inverse document frequency dictionary includes inverse document frequencies of a plurality of terms. Therefore, the inverse document frequency of the term may be queried from the inverse document frequency dictionary.

The inverse document frequency may include an inverse document frequency (uni_idf) of a term, inverse document frequencies (bi_idf) of two terms, and a comprehensive twp-term inverse document frequency feature obtained based on the inverse document frequencies of the two terms. When the inverse document frequency dictionary is generated, inverse document frequencies of the terms are calculated in the following manner.

"uni_idf" may be obtained by dividing a total quantity of files by a quantity of files including the term and obtaining a logarithm from an obtained quotient. A calculation manner of bi_idf is the same as a calculation manner of uni_idf. When bi_idf is calculated, only when two terms both occur in a file, and an interval distance of occurrence is less than a preset distance threshold, such as 5, the two terms occur in a file as two terms.

After bi_idf of the term and other terms is obtained, the comprehensive two-term inverse document frequency, such as a maximum two-term inverse document frequency (max_bi_idf), a minimum two-term inverse document frequency (min_bi_idf), an average two-term inverse document frequency (avg_bi_idf), or a converted two-term inverse document frequency (cov_bi_idf), of the term is calculated based on bi_idf. A calculation manner of the converted two-term inverse document frequency may be dividing avg_bi_idf of the term by a standard deviation of bi_idf of the term.

Figure 7:
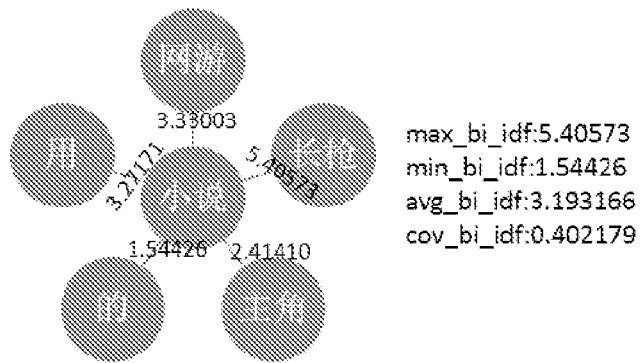
FIG. 7 is a schematic diagram of closeness features of a term and other terms according to this application.

As shown in FIG. 7, bi_idf values of a term "小说" with a term "网游", a term "长枪", a term "主角" a term "的", and a term "用" are respectively 3.33003, 5.40573, 2.4141, 1.54426, and 3.27171. it can be known through calculation that max_bi_idf is 5.40573, min_bi_idf is 1.54426, avg_bi_idf is 3.193166, and cov_bi_idf is 0.402179.

It should be noted that the inverse document frequency bi_idf of the two terms can reflect association between the two terms. The target term feature can improve determining accuracy of discarding/keeping of the term.

4. For the pointwise mutual information (PMI) feature, It counts probabilities of simultaneous occurrence of two terms in a document and may be used for balancing semantic correlation between the two terms.

When the pointwise mutual information feature of the term is determined, a pointwise mutual information feature dictionary (PMI dictionary) pre-generated according to the corpus may be obtained. The pointwise mutual information feature dictionary includes pointwise mutual information features of a plurality of terms. Therefore, a pointwise mutual information feature of the term may be queried from the pointwise mutual information feature dictionary.

Similar to the inverse document frequency, the pointwise mutual information feature may include pointwise mutual information features of two terms and comprehensive two-term pointwise mutual information features obtained based on the pointwise mutual information features of the two terms. When the pointwise mutual information feature dictionary is generated, the pointwise mutual information features of the term may be calculated in the following manner.

A calculation manner of two-term pointwise mutual information features PMI(term1, term2) is:

PMI(term1,term2)=p(term1,term2)/p(term1)*p(term2), where p(term1,term2) is a probability for the term 1 and the term 2 to simultaneously occur in a text, p(term1) is a probability for the term 1 to occur in the text, and p(term2) is a probability for the term 2 to occur in the text. A calculation manner for the term to occur in the text is: dividing a quantity of texts in which the term occurs by a total quantity of texts.

After PMI of the term and a plurality of other terms is obtained, comprehensive PMI, such as maximum PMI, minimum PMI, average PMI, and converted PMI, of the term is calculated based on the PMI. For calculation manners, refer to the inverse document frequency. Details are not described herein.

It should be noted that the PMI the two terms can reflect semantic correlation between the two terms. The target term feature can improve determining accuracy of discarding/keeping of the term.

5. For the term vector class feature, the term vector class feature can reflect a feature of the term in semantics and is specifically embodied as being capable of reflecting whether the term is similar to the query in semantics (such as a subject intent).

When the term vector class feature of the term is calculated, a term vector extraction tool pre-obtained by training according to the corpus may be obtained, and the term vector class feature of the term is trained by using the term vector extraction tool. For example, the term vector extraction tool is word2vec.

There may be a plurality of specific manners for the term vector extraction tool to extract the term vector class feature of the term. For example, one manner may be: calculating a vector cosine similarity between the term and other terms in the query, then in a manner similar to obtaining bi_idf, obtaining the term vector class feature. For another example, one manner may be: using an average term vector of all terms in the query as a term vector of the query, and then calculating a cosine similarity between the term vector of the term and the term vector of the query.

6. For the importance (IMP) feature, An IMP value of each term and an importance ratio of the term in each query are calculated in an iterative manner based on a query that has clear click intent. After iteration is performed for a plurality of times, an IMP value of each term gradually converges until IMP values obtained from previous iteration and next iteration change little, to obtain an IMP dictionary. The clear click intent may be determined from a click log of the user.

Compared with target term features such as the inverse document frequency, the target term feature can indicate importance of the term for the query result. Therefore, when the machine learning model is trained, and the machine learning model is used to determine the discarding/keeping condition of the term, a weight of the target term feature may be larger than that of the inverse document frequency.

When the IMP feature of the term is calculated, the query sample, the recalled document of the query sample, and the hit situation of the recalled document may be obtained, and the IMP is calculated by iteration for a plurality of times.

7. For the closeness feature, the target term feature may embody a closeness degree between a term and left and right terms. For example, a closeness result of a query "一 代宗师宋慧乔结局" is: 一代 0.678宗帅 0.057 宋 0.568 慧 0.670乔 0.061结局. Closeness between a term "一代" and a term "宗师" is 0.678, closeness between a term "宗师" and a term "宋" is 0.057, and the like.

When the closeness feature of the term is calculated, a calculation manner is: obtaining a query relationship tree pre-generated according to the corpus, and calculating the closeness feature of the term by using the query relationship tree. Specifically, the query relationship tree is constructed according to an inclusion relationship of terms in the queries, and closeness between adjacent terms is calculated from bottom to top layer by layer based on the query relationship tree and is recursively calculated for a plurality of times. Specifically, a weight of a node at which the term is located and a weight of a side connecting adjacent terms may be calculated, and closeness between adjacent terms is calculated by using two weights.

Another calculation manner is: calculation according to probabilities for the term and other terms to occur in the same document. It should be noted that an occurrence location interval is smaller than a preset interval threshold. Still another calculation manner is: calculating a plurality of closeness features of the term and then calculating a comprehensive value of the plurality of closeness features. Yet another calculation manner is: after the closeness feature of the term is obtained in any of the foregoing manners, correcting the closeness feature by using a dependence relationship between terms.

The target term feature may embody an association degree between the term and other terms. When the machine learning model is constructed, accuracy of the machine learning model may be improved by using the target term feature, to improve determining accuracy of the machine learning model for the discarding/keeping condition of the term of the input query.

8. For the term dimension feature, the feature is specific to a query and may be specifically a quantity of terms included in the query, a length of the query, and the like.

After the term of the query sample is obtained in step S401, eigenvalues of the term on the foregoing eight target term features may be calculated. Certainly, in actual application, there may be other target term eigenvalues provided that the target term eigenvalue can indicate importance of the target term feature for the query result.

It should be noted that the foregoing various dictionaries and various tree structures are generated by the corpus and are used for determining the eigenvalue of the term on the target term eigenvalue, and therefore may be referred to as a target term eigenvalue determining tool.

S404: Compose the query sample, the discarding/keeping condition of the term in the query sample, and a target term eigenvalue into a training set.

The query sample is obtained in step S401, the discarding/keeping condition of the term in the query sample is obtained in step S402, and the target term feature of the term is obtained in this step, that is, step S403. The three obtained ones may be composed into the training set, and further, the training set is used for training the machine learning model.

It should be noted that after the machine learning model is obtained, when the discarding/keeping condition of a term in a query is predicted by using a machine training model, a target term eigenvalue of the term in the query needs to be input. The target term eigenvalue of the term in the query may also be calculated according to the foregoing method.

In actual application, a correction retrieval item generated by a non-machine learning model for a target query may also be obtained, and a retrieval item generated by the machine learning model is corrected by using the correction retrieval item. A determining result (that is, a retrieval item corresponding to the target query) of the machine learning model is combined with a determining result of another manner (that is, "a non-machine learning model") such as a term empowerment manner, and the determining result of another manner is used to correct the determining result of the machine learning model. The determining result of another manner may be referred to as the correction retrieval item.

Specifically, whether a term determined as a non-certainly kept term is determined as a term with a large keeping probability is determined in determining results corresponding to the machine learning model; if yes, the non-certainly kept term is amended as a certainly kept term. A large keeping probability may be embodied as that the term is determined in another manner as a term that is ranked front and that has a preset quantity. After such correction, if a quantity of certainly kept terms exceeds a threshold corresponding to a quantity of terms in the query, terms with small keeping probabilities in all certainly kept terms are amended as non-certainly kept terms.

For example, for a query "Swisse 多种维生素哺乳期能吃吗", certainly kept terms determined by using the machine learning model include "维生" "素" "哺乳" and "期", and determined non-certainly kept terms include "Swisse" "多种" "能" "吃" and "吗". However, assuming that a term with a largest weight calculated in a term empowerment manner is "Swisse", and a term with a smallest weight is "期", the term "Swisse" is amended from a non-certainly kept term as a certainly kept term. There are five corrected certainly kept terms, respectively, "Swisse" "维生" "素" "哺乳" and "期". Assuming that there are four preset thresholds, in this case, a quantity of certainly kept terms is greater than a preset threshold. Therefore, the term "期" with the smallest weight in all the certainly kept terms are amended as a non-certainly kept term. Therefore, final certainly kept terms include "Swisse" "维生" "素" and "哺乳".

Alternatively, a determining result obtained by the machine learning model may be corrected by combining target term features such as the closeness feature and the syntax dependency feature. For example, the machine learning model determines one term in the terms " 代 " and "宗帅" as a certainly kept term, and determines the other term as a non-certainly kept, and closeness between two terms determined by the closeness feature is high. Therefore, the non-certainly kept term therein is amended as a certainly kept term.

Hence, the term discarding/keeping condition result obtained by combining a plurality of determining manners is more accurate.

Accuracy of the term determining method provided in this application is described below through experiment data.

In an experiment, 105829 queries are collected, and are divided into a training set and a test set according to a proportion of 8 to 2. The training set is trained by using a GBDT method to obtain the machine learning model, and after the machine learning model is tuned, a determining result of the machine learning model is tested by using the test set, to obtain that accuracy of the term discarding/keeping condition determined by the machine learning model is 0.80702. In another experiment, a success rate of the retrieval item generated in this application is 67.5% relative to the existing technology.

Figure 8:
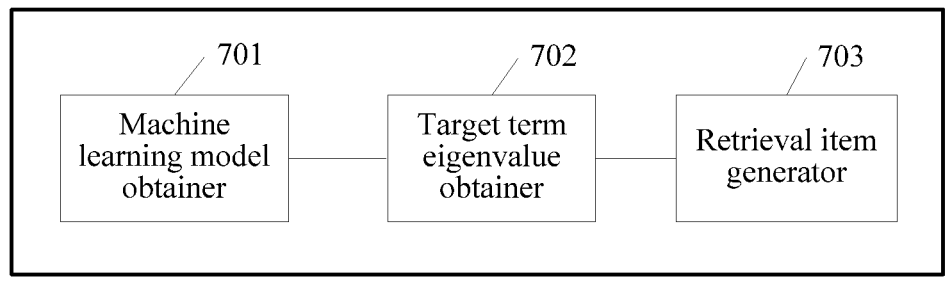
FIG. 8 is a schematic structural diagram of a retrieval item generation apparatus according to this application.

FIG. 8 shows a structure of a retrieval item generation apparatus provided in this application. The retrieval item generation apparatus specifically includes a machine learning model obtainer 701, a target term eigenvalue obtainer 702, and a retrieval item generator 703.

The machine learning model obtainer 701 is configured to obtain a machine learning model pre-obtained by training by a query sample, the query sample including a term, the term having a target term feature, and the target term feature being used for indicating importance of the term for a query result.

The target term eigenvalue obtainer 702 is configured to obtain a target query, and determine an eigenvalue of a term in the target query on the target term feature.

The retrieval item generator 703 is configured to input the target query and the eigenvalue into the machine learning model, to obtain a retrieval item corresponding to the target query.

Figure 9:
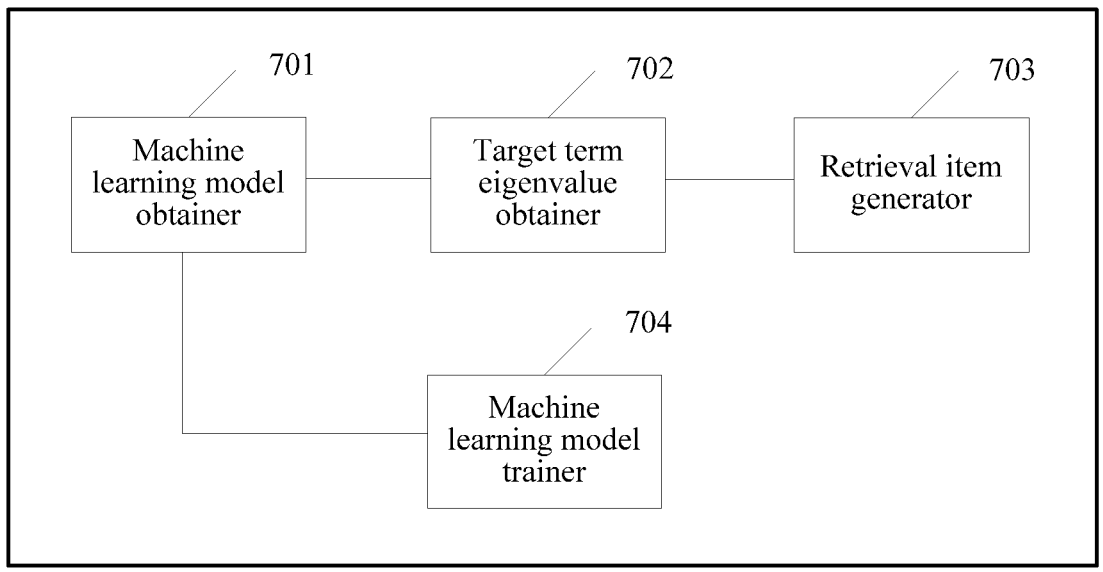
FIG. 9 is another schematic structural diagram of a retrieval item generation apparatus according to this application.

FIG. 9 shows another structure of a retrieval item generation apparatus provided in this application. The retrieval item generation apparatus specifically includes a machine learning model obtainer 701, a target term eigenvalue obtainer 702, a retrieval item generator 703, and a machine learning model trainer 704.

The machine learning model trainer 704 is configured to train the query sample, to obtain the machine learning model.

Figure 10:
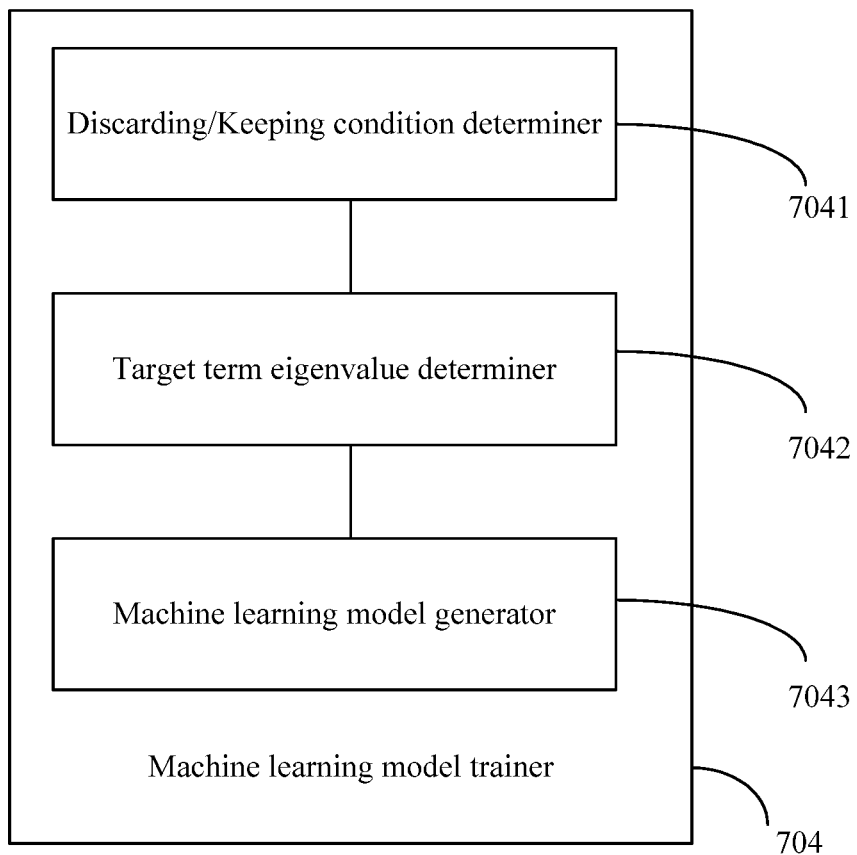
FIG. 10 is a schematic diagram of a detailed structure of a machine learning model trainer in an embodiment corresponding to FIG. 9.

As shown in FIG. 10, the machine learning model trainer 704 specifically includes a term discarding/keeping condition determiner 7041, a target term eigenvalue determiner 7042, and a machine learning model generator 7043.

The term discarding/keeping condition determiner 7041 is configured to determine a discarding/keeping condition of the term in the query sample after obtaining the query sample, the discarding/keeping condition being used for indicating whether the term is used for generating the retrieval item.

The target term eigenvalue determiner 7042 is configured to determine an eigenvalue of the term on the target term feature.

The machine learning model generator 7043 is configured to train the query sample, the discarding/keeping condition of the term, and the eigenvalue of the term, to obtain the machine learning model.

In an exemplary embodiment, when performing the step of determining the eigenvalue of the term on the target term feature, the target term eigenvalue determiner 7042 is specifically configured to: obtain a target term eigenvalue determining tool generated according to a corpus; and determine the eigenvalue of the term on the target term feature by using the target term eigenvalue determining tool.

In an example, when performing the step of determining the discarding/keeping condition of the term in the query sample, the term discarding/keeping condition determiner 7041 is specifically configured to obtain a recalled document corresponding to the query sample; determine a feature of the term in the query sample in the recalled document; and determine the discarding/keeping condition of the term in the query sample according to the feature.

In an example, when performing the step of determining the discarding/keeping condition of the term in the query sample, the term discarding/keeping condition determiner 7041 is specifically configured to: calculate a score of the term in the query sample according to the feature, and determine the discarding/keeping condition of the term according to the score.

Figure 11:
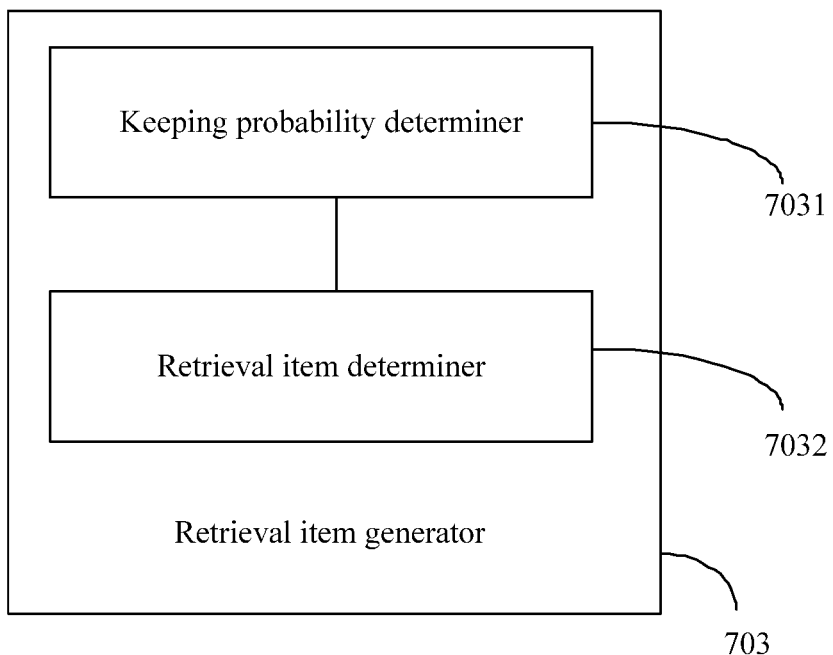
FIG. 11 is a schematic diagram of a detailed structure of a retrieval item generator corresponding to FIG. 8.

In an example, as shown in FIG. 11, the retrieval item generator 703 includes a keeping probability determiner 7031 and a retrieval item determiner 7032.

The keeping probability determiner 7031 is configured to input the target query and the eigenvalue into the machine learning model, to obtain a keeping probability of the term in the target query.

The retrieval item determiner 7032 is configured to determine a discarding/keeping condition of the term in the target query according to the keeping probability, a set of certainly kept terms being the retrieval item.

Figure 12:
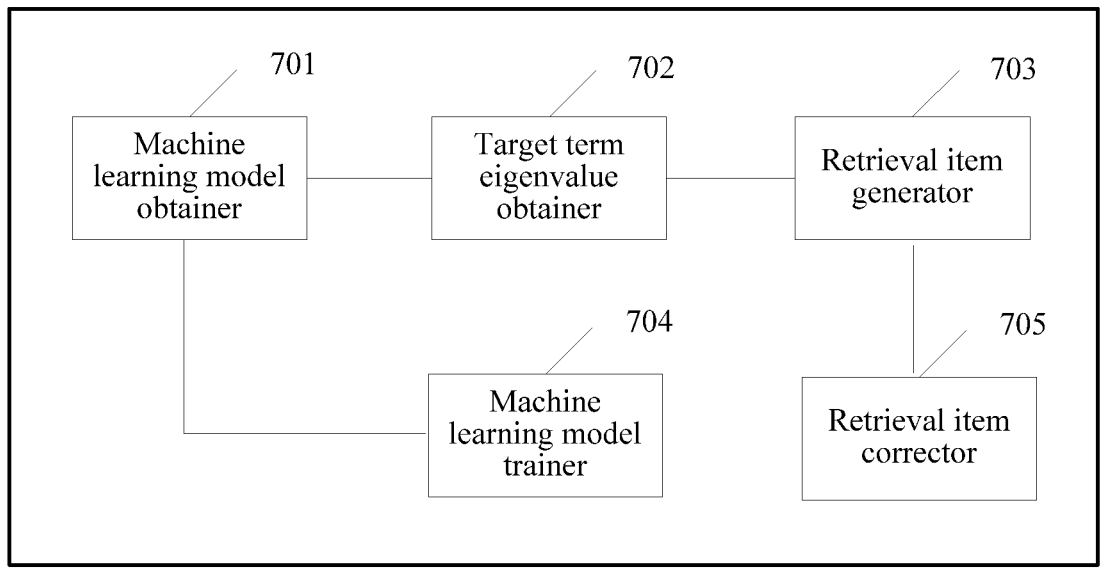
FIG. 12 is still another schematic structural diagram of a retrieval item generation apparatus according to this application.

FIG. 12 shows still another structure of a retrieval item generation apparatus provided in this application. The retrieval item generation apparatus specifically includes a machine learning model obtainer 701, a target term eigenvalue obtainer 702, a retrieval item generator 703, a machine learning model trainer 704, and a retrieval item corrector 705.

The retrieval item corrector 705 is configured to obtain a correction retrieval item generated by a non-machine learning model for the target query; and correct, by using the correction retrieval item, the retrieval item generated by the machine learning model.

In an example, the retrieval item corrector 705 includes a non-certainly kept term corrector.

The non-certainly kept term corrector is configured to determine whether a term determined by the machine learning model as a non-certainly kept term is determined by the non-machine learning model as meeting a certainly keeping condition; and if yes, correct the term determined by the machine learning model as a non-certainly kept term to be a certainly kept term.

In an example, the target term feature includes any one of the following items or a combination of a plurality of the following items:

a part-of-speech feature, a syntax dependency feature, an inverse document frequency, pointwise mutual information, a term vector class feature, an importance feature, closeness, and a term dimension feature.

In an exemplary embodiment, the retrieval item generation apparatus provided in this application further includes:

a second corrector, configured to correct, by combining the target term feature, the retrieval item generated by the machine learning model.

Figure 13:
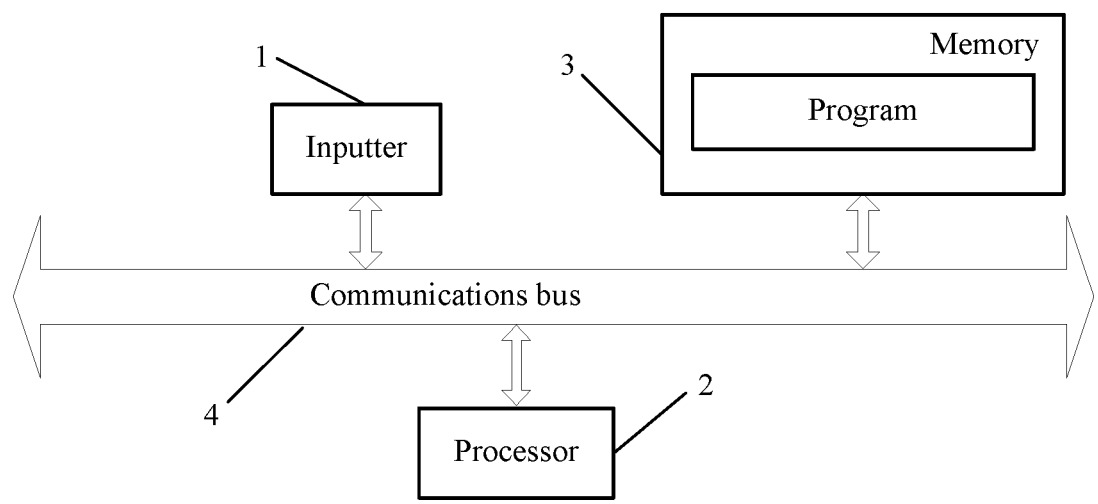
FIG. 13 is a schematic diagram of a hardware structure of a retrieval item generation device according to this application.

A hardware structure of a retrieval item generation device provided in this embodiment of this application is described below. FIG. 13 is a schematic diagram of a hardware structure of a retrieval item generation device according to this application. Referring to FIG. 13, the device may include: an inputter 1, a processor 2, a memory 3, and a communications bus 4.

The inputter 1, the processor 2, and the memory 3 communicate with each other through the communications bus 4.

Optionally, the inputter 1 is configured to input data; the processor 2 is configured to execute a program; the memory 3 is configured to store the program.

The program may include program code, and the program code includes an operation instruction of the processor.

The processor 2 may be a central processing unit (CPU) or an application-specific integrated circuit (ASIC), or may be one or more integrated circuits configured to implement the embodiments of this application.

The memory 3 may include a high-speed RAM memory, and may further include a non-volatile memory, for example, at least one magnetic disk memory.

The inputter 1 is configured to input a query sample.

The processor 2 is configured to configured to train the query sample, to obtain a machine learning model, the query sample including a term, the term having a target term feature, and the target term feature being used for indicating importance of the term for a query result; obtain a target query, and determine an eigenvalue of a term in the target query on the target term feature; and input the target query and the eigenvalue into the machine learning model, to obtain a retrieval item corresponding to the target query.

In an exemplary embodiment, this application further provides an electronic device, including:

a processor;

a memory configured to store processor-executable instructions, the processor being configured to perform the retrieval item generation method in the foregoing exemplary embodiments.

Specific manners for the processor in the electronic device to perform operations in this embodiment have been described in detail in embodiments related to the retrieval item generation method and are not described in detail herein.

In an exemplary embodiment, this application provides a computer-readable storage medium. The computer-readable storage medium stores a computer program, and the computer program may be executed by a processor to complete the retrieval item generation method in the foregoing exemplary embodiments.

It should be noted that the embodiments in this specification are all described in a progressive manner. Description of each of the embodiments focuses on differences from other embodiments, and reference may be made to each other for the same or similar parts among respective embodiments.

It should further be noted that the relational terms herein such as first and second are used only to differentiate an entity or operation from another entity or operation, and do not require or imply any actual relationship or sequence between these entities or operations. Moreover, the terms "include", "comprise", and any other variant thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Unless otherwise specified, an element limited by "include a/an . . . " does not exclude other same elements existing in the process, method, object, or device that includes the elements.

The above descriptions of the disclosed embodiments make a person skilled in the art implement or use this application. Various modifications to these embodiments are obvious to a person skilled in the art, and the general principles defined in this specification may be implemented in other embodiments without departing from the spirit and scope of this application. Therefore, this application is not limited to these embodiments illustrated in this application, but needs to conform to the broadest scope consistent with the principles and novel features disclosed in this application.

What is claimed is:

1. A method performed at a computing device having one or more processors and memory storing programs to be executed by the one or more processors, the method comprising:
    generating a machine learning model for processing search query terms, the generating including training the model using query samples having multiple search terms to obtain target term features of the multiple search terms, wherein a target term feature of a search term within a query is used for indicating a relative importance of the term relative to other search terms in the same query for a query result;
    after the generating,
    receiving from a user a target query;
    segmenting the target query into a plurality of search terms;
    determining, for each search term of the plurality of search terms, an eigenvalue for the search term based on the target term feature of the search term obtained by the machine learning model;
    inputting the plurality of search terms and a plurality of eigenvalues corresponding to the plurality of search terms into the machine learning model, wherein the machine learning model is configured to:
        for each search term of the plurality of search terms, (1) calculate a score for the search term; and (2) determine a discarding/keeping condition of the search term according to the score, including:
            obtaining a recalled document corresponding to the query samples;
            determining a feature of the term in the query samples in the recalled document; and
            determining the discarding/keeping condition of the term in the query samples according to the feature; and
        select, from the plurality of search terms, a subset of search terms whose scores exceed a preset threshold as retrieval terms for the target query;
    using the retrieval terms as a new search query to be input into a search engine; and
    displaying, to the user, documents returned by the search engine in response to the new search query.

2. The method according to claim 1, wherein the training further comprises:
    determining a discarding/keeping condition of a term in a query sample after obtaining the query sample, the discarding/keeping condition being used for indicating whether the term is used for generating the retrieval terms;
    determining an eigenvalue of the term on the target term feature; and
    training the query sample, the discarding/keeping condition of the term, and the eigenvalue of the term, to obtain the machine learning model.

3. The method according to claim 2, wherein determining an eigenvalue of the term on the target term feature comprises:
    obtaining a target term eigenvalue determining tool generated according to a corpus; and
    determining the eigenvalue of the term on the target term feature by using the target term eigenvalue determining tool.

4. The method according to claim 1, further comprising:
    obtaining a correction retrieval item generated by a non-machine learning model for the target query; and
    correcting, using the correction retrieval item, the retrieval terms.

5. The method according to claim 4, wherein correcting the retrieval terms comprises:
    in accordance with a determination that a term determined by the machine learning model as a non-certainly kept term is determined by the non-machine learning model as meeting a certainly keeping condition, correcting the term determined by the machine learning model from a non-certainly kept term to a certainly kept term.

6. The method according to claim 1, wherein the target term feature comprises any one of the following items or a combination of a plurality of the following items:
    a part-of-speech feature, a syntax dependency feature, an inverse document frequency, pointwise mutual information, a term vector class feature, an importance feature, closeness, and a term dimension feature.

7. A computing device comprising one or more processors, memory coupled to the one or more processors and a plurality of programs stored in the memory that, when executed by the one or more processors, cause the computing device to perform a plurality of operations comprising:
    generating a machine learning model for processing search query terms, the generating including training the model using query samples having multiple search terms to obtain target term features of the multiple search terms, wherein a target term feature of a search term within a query is used for indicating a relative importance of the term relative to other search terms in the same query for a query result;
    after the generating,
    receiving from a user a target query;
    segmenting the target query into a plurality of search terms;
    determining, for each search term of the plurality of search terms, an eigenvalue for the search term based on the target term feature of the search term obtained by the machine learning model;
    inputting the plurality of search terms and a plurality of eigenvalues corresponding to the plurality of search terms into the machine learning model, wherein the machine learning model is configured to:
        for each search term of the plurality of search terms, (1) calculate a score for the search term; and (2) determine a discarding/keeping condition of the search term according to the score, including:
            obtaining a recalled document corresponding to the query samples;
            determining a feature of the term in the query samples in the recalled document; and determining the discarding/keeping condition of the term in the query samples according to the feature; and select, from the plurality of search terms, a subset of search terms whose scores exceed a preset threshold as retrieval terms for the target query;

using the retrieval terms as a new search query to be input into a search engine; and displaying, to the user, documents returned by the search engine in response to the new search query.

8. The computing device according to claim 7, wherein the training further comprises:

determining a discarding/keeping condition of a term in a query sample after obtaining the query sample, the discarding/keeping condition being used for indicating whether the term is used for generating the retrieval terms;

determining an eigenvalue of the term on the target term feature; and training the query sample, the discarding/keeping condition of the term, and the eigenvalue of the term, to obtain the machine learning model.

9. The computing device according to claim 8, wherein determining an eigenvalue of the term on the target term feature comprises:

obtaining a target term eigenvalue determining tool generated according to a corpus; and determining the eigenvalue of the term on the target term feature by using the target term eigenvalue determining tool.

10. The computing device according to claim 7, wherein the plurality of operations further comprise:

obtaining a correction retrieval item generated by a non-machine learning model for the target query; and correcting, using the correction retrieval item, the retrieval terms.

11. The computing device according to claim 7, wherein the target term feature comprises any one of the following items or a combination of a plurality of the following items:

a part-of-speech feature, a syntax dependency feature, an inverse document frequency, pointwise mutual information, a term vector class feature, an importance feature, closeness, and a term dimension feature.

12. A non-transitory computer readable storage medium storing a plurality of machine readable instructions in connection with a computing device having one or more processors, wherein the plurality of machine readable instructions, when executed by the one or more processors, cause the computing device to perform a plurality of operations including:

generating a machine learning model for processing search query terms, the generating including training the model using query samples having multiple search terms to obtain target term features of the multiple search terms, wherein a target term feature of a search term within a query is used for indicating a relative importance of the term relative to other search terms in the same query for a query result;

after the generating, receiving from a user a target query;

segmenting the target query into a plurality of search terms;

determining, for each search term of the plurality of search terms, an eigenvalue for the search term based on the target term feature of the search term obtained by the machine learning model;

inputting the plurality of search terms and a plurality of eigenvalues corresponding to the plurality of search terms into the machine learning model, wherein the machine learning model is configured to:

for each search term of the plurality of search terms, (1) calculate a score for the search term; and (2) determine a discarding/keeping condition of the search term according to the score, including:

obtaining a recalled document corresponding to the query samples;

determining a feature of the term in the query samples in the recalled document; and determining the discarding/keeping condition of the term in the query samples according to the feature; and select, from the plurality of search terms, a subset of search terms whose scores exceed a preset threshold as retrieval terms for the target query;

using the retrieval terms as a new search query to be input into a search engine; and displaying, to the user, documents returned by the search engine in response to the new search query.

13. The non-transitory computer readable storage medium according to claim 12, wherein the training further comprises:

determining a discarding/keeping condition of a term in a query sample after obtaining the query sample, the discarding/keeping condition being used for indicating whether the term is used for generating the retrieval terms;

determining an eigenvalue of the term on the target term feature; and training the query sample, the discarding/keeping condition of the term, and the eigenvalue of the term, to obtain the machine learning model.

* * * * *